(12) United States Patent
Goswami et al.

(10) Patent No.: US 10,298,841 B2
(45) Date of Patent: May 21, 2019

(54) DEVICE AND METHOD FOR GENERATING A PANORAMIC IMAGE

(71) Applicant: SONY CORPORATION, Tokyo (JP)

(72) Inventors: Nabarun Goswami, Bangalore (IN); Madhvesh Sulibhavi, Bangalore (IN); Pramod Chintalapoodi, San Diego, CA (US)

(73) Assignee: Sony Corporation, Tokyo (JP)

( * ) Notice: Subject to any disclaimer, the term of this patent is extended or adjusted under 35 U.S.C. 154(b) by 461 days.

(21) Appl. No.: 14/947,052

(22) Filed: Nov. 20, 2015

(65) Prior Publication Data

US 2017/0150045 A1    May 25, 2017

(51) Int. Cl.
  *H04N 1/21*    (2006.01)
  *H04N 5/232*   (2006.01)
  *H04N 5/265*   (2006.01)
  *H04N 5/225*   (2006.01)

(52) U.S. Cl.
  CPC ....... *H04N 5/23238* (2013.01); *H04N 1/2112* (2013.01); *H04N 5/2254* (2013.01); *H04N 5/23212* (2013.01); *H04N 5/265* (2013.01)

(58) Field of Classification Search
  None
  See application file for complete search history.

(56) References Cited

U.S. PATENT DOCUMENTS

| 7,424,218 B2 | 9/2008 | Baudisch et al. |
| 8,811,769 B1 | 8/2014 | Pitts et al. |
| 9,013,543 B1 | 4/2015 | Furukawa et al. |
| 2014/0013273 A1 | 1/2014 | Ng |
| 2014/0022337 A1 | 1/2014 | Putraya et al. |

(Continued)

FOREIGN PATENT DOCUMENTS

| EP | 2784736 A1 | 10/2014 |
| WO | 2015/100301 A1 | 7/2015 |

OTHER PUBLICATIONS

Jokinen, Olli Kauhanen, Heikki Department of Built Environment, Aalto University, Finland in Automation in Construction Dec. 2017 84:274-291.*

(Continued)

*Primary Examiner* — William C Vaughn, Jr.
*Assistant Examiner* — Daniel T Tekle
(74) *Attorney, Agent, or Firm* — Chip Law Group

(57) ABSTRACT

Various aspects of a device, such as an imaging device, and method to generate a panoramic image are disclosed herein. The imaging device comprises a micro-lens array configured to capture light-field (LF) data associated with a field-of-view (FOV) of the imaging device. One or more circuits in the imaging device focus on a first subject to determine a first frame. The first frame is based on a first realignment of the stored LF data of the first subject in the FOV. Determination of one or more other frames occurs when the one or more circuits dynamically refocus on one or more other subjects. A panoramic image is generated from a combination of the determined first frame and the determined one or more other frames. The generated panoramic image corresponds to a pseudo three-dimensional image that contributes to the depth perception of the selected one or more subjects.

26 Claims, 8 Drawing Sheets

(56) References Cited

U.S. PATENT DOCUMENTS

| | | | |
|---|---|---|---|
| 2014/0240578 A1* | 8/2014 | Fishman | H04N 5/23212 348/333.08 |
| 2015/0093038 A1 | 4/2015 | Mocanu et al. | |
| 2015/0264335 A1 | 9/2015 | Park | |
| 2016/0105649 A1* | 4/2016 | Pettegrew | G06T 7/80 348/37 |

OTHER PUBLICATIONS

International Search Report and Written Opinion of PCT Application No. PCT/US2016/059732, dated Jan. 24, 2017, 11 pages.

William Lu et al, "3D and Image Stitching With The Lytro Light-Field Camera", City College of City University of New York, May 22, 2013, p. 19, New York, US.

Clemens Birklbauer et al, "Panorama Light-Field Imaging", Institute of Computer Graphics,, 2012, p. 1, Johannes Kepler University Linz, Austria.

KE Colin Zheng et al, "Layered Depth Panoramas", 2007, pp. 8, Document: 1-4244-1180 IEEE, Microsoft Research, Redmond, WA.

* cited by examiner

DEVICE AND METHOD FOR GENERATING A PANORAMIC IMAGE

FIELD

Various embodiments of the disclosure relate to a device and method to generate a panoramic image. More specifically, various embodiments of the disclosure relate to a device and method to generate a panoramic image based on light-field (LF) data.

BACKGROUND

Recent advancements in the field of light-field photography have led to the development of high-end plenoptic imaging devices that capture light-field (LF) data. Such imaging devices capture the LF data associated with multiple subjects and/or objects present in a field-of-view (FOV) of the imaging device. Typically, for each object, the LF data corresponds to a vector function that describes the amount of light that flows in every direction through every point in the FOV of the imaging device. The vector function may correspond to a multidimensional (such as five-dimensional or more) plenoptic function that specifies variables, such as a position and a direction of each light ray, with respect to an optical axis. The plenoptic function may exhibit higher dimensionality based on additional variables, such as time, wavelength, and polarization angles. Such higher dimensional plenoptic functions may enable reconstruction of every possible view of the multiple subjects and/or objects, at every moment, from every position, at every wavelength in the FOV of the imaging device.

In certain scenarios, plenoptic imaging devices may generate panoramic images based on multiple FOVs with minimum parallax error. The LF data associated with multiple FOVs may be stitched together to generate panoramic images. However, such a panoramic image may correspond to a flat two dimensional or three dimensional image. Also, the generation of such panoramic images may require substantial memory to store the LF data associated with the multiple FOVs. It may be desired that the generated panoramic images provide a depth perception of the captured subjects and/or objects present in the selected FOVs with optimized memory utilization.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A device and method to generate a panoramic image is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
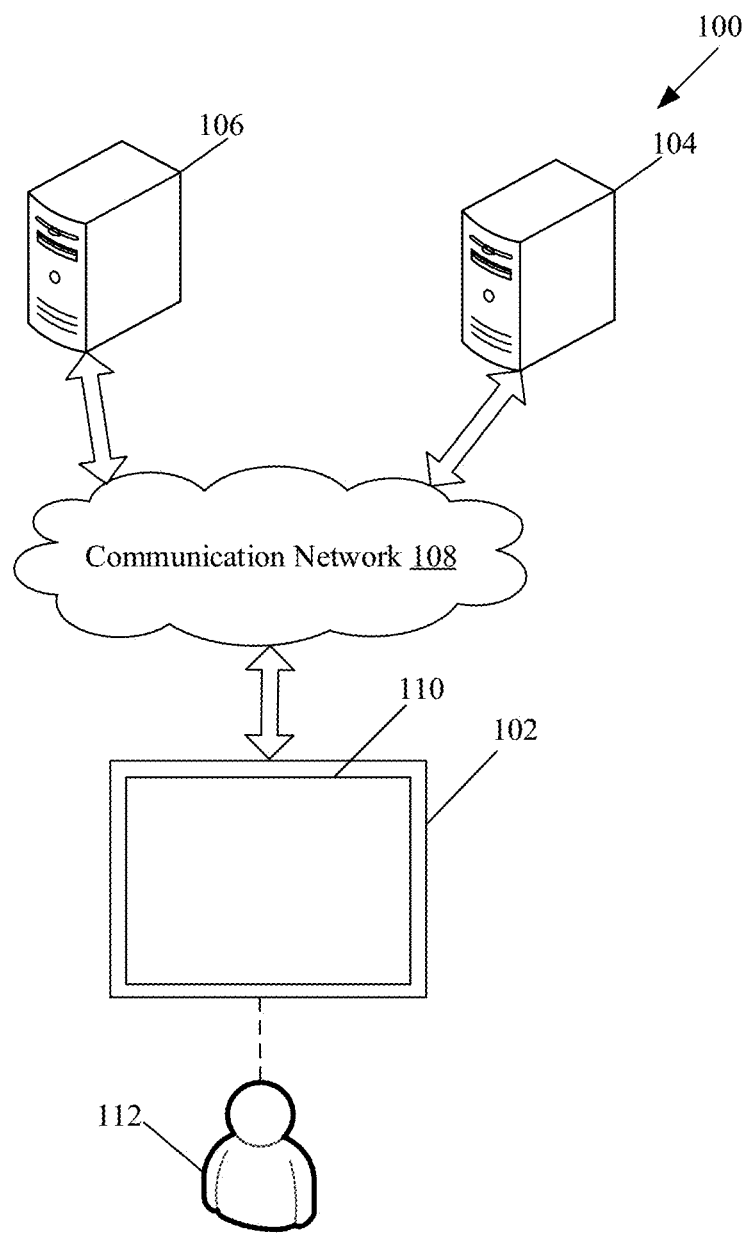
FIG. 1 is a block diagram that illustrates a network diagram for generation of a panoramic image, in accordance with an embodiment of the disclosure.

Various implementations may be found in a device and/or method to generate a panoramic image. Exemplary aspects of the disclosure may comprise an imaging device that comprises a micro-lens array which may further comprise a plurality of micro-lenses. The micro-lens array, in conjunction with a light sensor, may be configured to capture light-field (LF) data associated with a field-of-view (FOV) of the imaging device. To determine a first frame, the method may comprise focusing on a first subject based on a first realignment of the stored LF data of the first subject in the FOV. To determine one or more other frames, a dynamic refocus on one or more other subjects, based on a second realignment of the captured LF data of each of the one or more other subjects in the FOV may be required. Based on combination of the determined first frame and the determined one or more other frames, a panoramic image may be generated. A format of the generated panoramic image may correspond to one of a motion picture, a Light-field Picture (LFP) image, a Graphics Interchange Format (GIF) image, or a Joint Photographic Experts Group (JPEG) image.

In accordance with an embodiment, the captured LF data associated with the FOV may be stored at the imaging device. In accordance with an embodiment, the first subject and the one or more other subjects may be indicated on a display screen of the imaging device, based on a bounding box and/or an object marker.

In accordance with an embodiment, a user input to focus on the first subject may be received by the imaging device. Further, user input may be received for the dynamic refocus on the one or more other subjects. In accordance with an embodiment, the user input may correspond to a selection of the one or more subjects from the first subject and the one or more other subjects. Each of the selected one or more subjects may be focused sequentially when the generated panoramic image is rendered on a display screen.

In accordance with an embodiment, the user input may comprise a pinch-in or a pinch-out operation, performed by a user. The pinch-in or pinch-out operation may be performed on a bounding box and/or an object marker associated with the first subject and the one or more other subjects.

In accordance with an embodiment, the captured LF data associated with the FOV may be stored in a non-volatile memory. The stored LF data may correspond to the selected one or more subjects from the first subject and the one or more other subjects. In accordance with an embodiment, focus on the first subject and dynamic refocus on the one or more other subjects, may be based on a pre-stored algorithm. In accordance with an embodiment, the first realignment and the second realignment of the captured LF data may correspond to modification of one or more parameters associated with the LF data associated with the FOV.

In accordance with an embodiment, the one or more parameters may comprise at least a depth-of-field of the focused first subject and the dynamically refocused one or more other subjects in the FOV, aperture diameter of main lens, inverse magnification factor of the plurality of micro-lenses in the micro-lens array, F-number for the plurality of micro-lenses in the micro-lens array, focal length of the plurality of micro-lenses in the micro-lens array, depth-of-field of the FOV, wavelength of light, pixel size of pixels in one or more photo-sensors of the imaging device, frame rate, and/or a rate-of-change of focus between selected said first subject, a second subject of said one or more other subjects, and one or more objects (such as white board and highlighters) in the FOV.

In accordance with an embodiment, the combination of the determined first frame and the determined one or more other frames may comprise LF image stitching of two or more frames from the determined first frame and the determined one or more other frames. In such cases, a parallax error that corresponds to the stitched two or more frames from the determined first frame and the determined one or more other frames, may be minimized. In accordance with an embodiment, the generated panoramic image may be rendered based on one or more user preferences and/or pre-stored values in a non-volatile memory. The one or more user preferences may include a frame rate associated with the determined first frame and the determined one or more other frames, or a rate-of-change of focus of the imaging device between the focused first subject and the dynamically refocused one or more other subjects.

FIG. 1 is a block diagram that illustrates a network diagram for generation of a panoramic image, in accordance with an embodiment of the disclosure. With reference to FIG. 1, the network environment 100 may comprise an electronic device 102, an application server 104, a content server 106, and a communication network 108. The network environment 100 may further include a display device 110 and one or more users, such as a user 112. The display device 110 may be included in the electronic device 102. The user 112 may be associated with the electronic device 102. The electronic device 102, the application server 104, and the content server 106 may be communicatively coupled with each other, via the communication network 108.

The electronic device 102 may comprise suitable logic, circuitry, interfaces, and/or code that may be configured to capture light-field (LF) data associated with a plurality of LF images. The electronic device 102 may be further configured to receive a user input from the user 112, via the display device 110. The electronic device 102 may be further configured to generate a panoramic image based on the captured LF data and/or the received user input. The electronic device 102 may be further configured to display the generated panoramic image on the display device 110. Examples of the electronic device 102 may include, but are not limited to, a standard plenoptic camera, a focused plenoptic camera, a coded aperture camera, a stereo-plenoptic camera, and/or a phase-distance (CAFADIS) camera.

The application server 104 may comprise suitable logic, circuitry, interfaces, and/or code that may be configured to host one or more applications to process the LF data associated with a plurality of FOVs. The application server 104 may be configured to host the one or more applications for one or more subscribed devices, such as the electronic device 102. The application server 104 may be implemented by use of several technologies that are well known to those skilled in the art.

The content server 106 may comprise suitable logic, circuitry, interfaces, and/or code that may be configured to provide LF data (associated with the plurality of FOVs) to the electronic device 102. The content server 106 may be implemented by use of several technologies that are well known to those skilled in the art.

The communication network 108 may include a medium through which the electronic device 102 may communicate with one or more servers, such as the application server 104 and/or the content server 106. Examples of the communication network 108 may include, but are not limited to, the Internet, a cloud network, a Long Term Evolution (LTE) network, a Wireless Fidelity (Wi-Fi) network, a Wireless Local Area Network (WLAN), a Local Area Network (LAN), a telephone line (POTS), and/or a Metropolitan Area Network (MAN). Various devices in the network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), Hypertext Transfer Protocol Secure (HTTPS), File Transfer Protocol (FTP), Zigbee, EDGE, infrared (IR), IEEE 802.11, 802.16, cellular communication protocols, Bluetooth (BT) communication protocols, and/or close proximity wireless transfer protocols or techniques, such as near field communication (NFC) or TransferJet.

The display device 110 may comprise suitable logic, circuitry, interfaces, and/or code that may be configured to indicate bounding boxes and/or object markers that enclose a plurality of subjects in the plurality of FOVs. The display device 110 may be further configured to receive one or more user input actions from one or more users, such as the user 112. Examples of the display device 110 may include, but are not limited to, a Liquid Crystal Display (LCD) display, Light Emitting Diode (LED) display, plasma display, Organic LED (OLED) display technology, and/or other display technology.

In operation, the micro-lens array, in conjunction with LF sensors (as described in FIG. 2B) of the electronic device 102, may be configured to capture LF data of a plurality of subjects in a first FOV of the electronic device 102. The LF sensors may be configured to capture raw image data of the first FOV, in addition to the LF data. For brevity, the raw image data and the LF data have been considered as two separate measurements obtained from the LF sensors. However, a person with ordinary skill in the art will appreciate that the LF data may correspond to a combination of the raw image data and the LF data, known as an LF image, associated with the plurality of subjects in the first FOV.

In accordance with an embodiment, the electronic device 102 may be configured to process the captured LF data by use of a pre-stored application in the electronic device 102. In accordance with an embodiment, the electronic device 102 may be configured to download the one or more applications from the application server 104, to process the captured LF data. The one or more applications may be downloaded from the application server 104, via the communication network 108.

In accordance with an embodiment, the electronic device 102 may be configured to retrieve the LF data of the plurality of subjects from the content server 106, via the communication network 108. Such received LF data may correspond to LF data captured by the electronic device 102 at an earlier instant of time. The earlier-captured LF data may be transmitted to the content server 106, via the communication network 108, for later use by the electronic device 102. In accordance with an embodiment, the content server 106 may stream the LF data to the electronic device 102, via the communication network 108, in real time.

The electronic device 102 may be configured to store the LF data associated with the FOV in a volatile memory, such as a Random Access Memory (RAM) or a cache memory. The electronic device 102 may be further configured to identify a set of focusable subjects from the plurality of subjects present in the first FOV of the electronic device 102. The set of focusable subjects may be identified based on the LF data of the one or more subjects by use of active autofocus systems, passive autofocus systems or a combination thereof, known in the art. The set of focusable subjects may be further identified when a focus metric associated with scene depth of the first FOV, which includes the one or more subjects, is an optimal focus metric.

In accordance with an embodiment, the electronic device 102 may be configured to display the identified set of focusable subjects on the display device 110. The electronic device 102 may be further configured to indicate the identified set of focusable subjects, based on a bounding box and/or an object marker. In accordance with an embodiment, the bounding box and/or the object marker may enclose an area that may encompass the identified set of focusable subjects.

In accordance with an embodiment, the electronic device 102 may be configured to receive an input from the user 112. The electronic device 102 may be configured to receive the user input by use of touch-sensitive gestures, via the display device 110. The received user input may correspond to selection of one or more subjects from the set of focusable subjects, displayed on the display device 110. In accordance with an embodiment, the received user input may further correspond to de-selection of the one or more selected subjects from the set of focusable subjects. The one or more selected subjects may be de-selected based on removal of the bounding box and/or the object marker associated with the one or more selected subjects.

In accordance with an embodiment, another user input that corresponds to a pinch-in or a pinch-out operation, may be received from the user 112. The electronic device 102 may be configured to adjust the area enclosed by the bounding box and/or the object marker associated with the one or more selected subjects. The area may be adjusted by use of the pinch-in or the pinch-out operation on the bounding box and/or the object marker. For example, the user 112 may provide a long-touch gesture on one of the selected subjects, displayed on a touch-sensitive screen of the display device 110. Accordingly, a corresponding bounding box and/or the object marker that encompasses the selected subject may be displayed at the display device 110. Thereafter, the user 112 may again touch at least an edge or a vertex of the bounding box and/or the object marker, and drag-in (or drag-out) the edge or a vertex of the area enclosed by the bounding box and/or the object marker. Alternatively, the user 112 may touch at least two edges or vertices, perform a pinch-in (or a pinch-out) operation to simultaneously drag-in (or drag-out) the at least two edges or vertices of the enclosed area. The drag-in (or drag-out) operation may adjust the area enclosed by the bounding box and/or the object marker. More specifically, the adjustment may correspond to enlargement and/or reduction of the area enclosed by the bounding box and/or the object marker based on the pinch-in or the pinch-out operation.

In accordance with an embodiment, the electronic device 102 may be configured to store the captured LF data of the selected one or more subjects in a non-volatile memory of the electronic device 102. The electronic device 102 may be further configured to delete the captured LF data from the volatile memory that corresponds to the one or more unselected subjects in the set of focusable subjects.

Based on the received user input, the electronic device 102 may be configured to focus on a first subject from the selected one or more subjects. Such a focus on the first subject may be based on a first realignment of the stored LF data of the first subject. It may be apparent to a person with ordinary skill in the art that the first realignment of the stored LF data may be based on one or more operations performed on the stored LF data with respect to the first subject. The one or more operations may comprise at least an integration of intensities (at one or more LF image plane locations) of the LF data of the first subject, screen depth computation, and/or simulation of tilt/shift lens performed on the LF data of the first subject. Based on the one or more operations, the electronic device 102 may modify one or more parameters associated with the LF data. Examples of the one or more parameters may include, but are not limited to, a depth-of-field of the focused first subject, aperture diameter of main lens, inverse magnification factor of the plurality of micro-lenses in the micro-lens array, F-number for the plurality of micro-lenses in the micro-lens array, focal length of the plurality of micro-lenses in the micro-lens array, depth-of-field of the first FOV, wavelength of light, and/or pixel size of pixels in one or more photo-sensors of the electronic device 102. The electronic device 102 may be configured to determine a first frame that comprises the focused first subject, based on the first realignment of the stored LF data.

In accordance with an embodiment, based on the received user input, the electronic device 102 may be configured to dynamically refocus on one or more other subjects, such as a second subject, from the selected one or more subjects. In such a case, the refocus on the second subject may be based on a second realignment of the stored LF data. With respect to the second subject, the second realignment of the stored LF data may be based on one or more operations performed on the stored LF data with respect to the second subject. Such one or more operations to focus the second subject may be similar to the one or more operations performed to focus the first subject. The electronic device 102 may be configured to determine a second frame that may comprise the focused second subject, based on the second realignment of the stored LF data. Similarly, the electronic device 102 may determine one or more other frames that comprise the focused one or more other subjects, based on realignments of the stored LF data to which they correspond.

In accordance with an embodiment, the electronic device 102 may be configured to create a first stack of frames that correspond to the first FOV. The first stack of frames may comprise the determined first frame and/or the determined one or more other frames. The determined first frame and/or the determined one or more other frames may comprise the focused first subject and/or the focused one or more other subjects, respectively. Therefore, each frame in the first stack of frames, created for the first FOV, may comprise at least one focused subject from the set of selected subjects. In accordance with an embodiment, the electronic device 102 may be further configured to create subsequent stacks of frames that correspond to the one or more subsequent FOVs.

The electronic device 102 may be configured to combine the created first stack of frames and the created subsequent stacks of frames. The combination of the created first stack of frames and the created subsequent stacks of frames may comprise panoramic image stitching, by use of one or more LF image stitching techniques, known in the art. Examples of such LF image stitching techniques may include, but are not limited to, invariant local feature mapping, geometry of LF image recognition by use of camera matrices, holography creation between at least two LF images, and/or interpolation between pixels for an optimal quality of the panoramic image. The electronic device 102 may be further configured to generate a panoramic image, based on the stitched first stack of frames and the subsequent stacks of frames. The stitched first stack of frames and the subsequent stacks of frames may include one or more inconsistencies, such as parallax error, lens distortion, scene motion, and exposure differences. Such one or more inconsistencies may be resolved by use of one or more image processing and/or computer vision algorithms known in the art.

In accordance with an embodiment, the electronic device 102 may be configured to receive one or more user preferences from the user 112. The one or more user preferences may be received, via the display device 110, based on the one or more touch-sensitive gestures. In accordance with an embodiment, the one or more user preferences may be received by the electronic device 102, based on one or more audio input actions. In accordance with an embodiment, the one or more user preferences may correspond to a frame rate associated with display of the determined first frame and the determined second frame associated with first FOV. The frame rate may be further associated with the display of the one or more other frames associated with one or more subsequent FOVs of the plurality of FOVs of the electronic device 102. In accordance with an embodiment, the frame rate may determine a time duration for which a frame from the stack of frames is displayed on the display device 110. In accordance with an embodiment, the one or more user preferences may correspond to a rate-of-change of focus between the selected one or more subjects in the first FOV in the generated panoramic image. Each frame that includes at least one focused subject may be displayed based on the rate-of-change of focus between the selected one or more subjects in the first FOV in the generated panoramic image. Notwithstanding, the disclosure may not be so limited, and the frame rate and/or the rate-of-change of focus of the generated panoramic image may be automatically determined by the electronic device 102, without limitation of the scope of the disclosure.

In accordance with an embodiment, the generated panoramic image may be rendered on the display device 110, based on the received one or more user preferences and/or automatically determined values that correspond to the frame rate and/or the rate-of-change of focus. In accordance with an embodiment, the electronic device 102 may be configured to transmit the generated panoramic image to the content server 106 for storage.

Figure 2A:
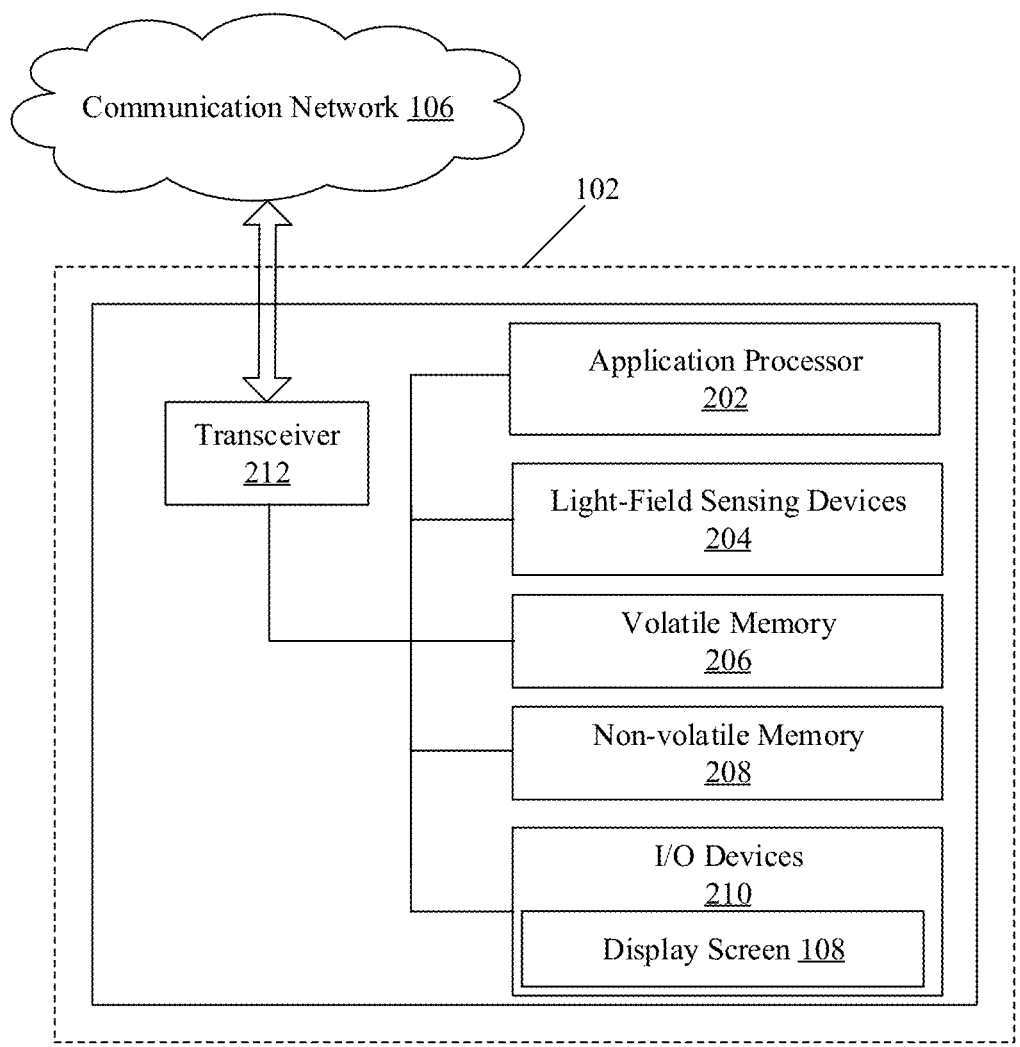
FIGS. 2A and 2B are detailed block diagrams that illustrate an exemplary electronic device that generates a panoramic image, in accordance with an embodiment of the disclosure.
Figure 2B:
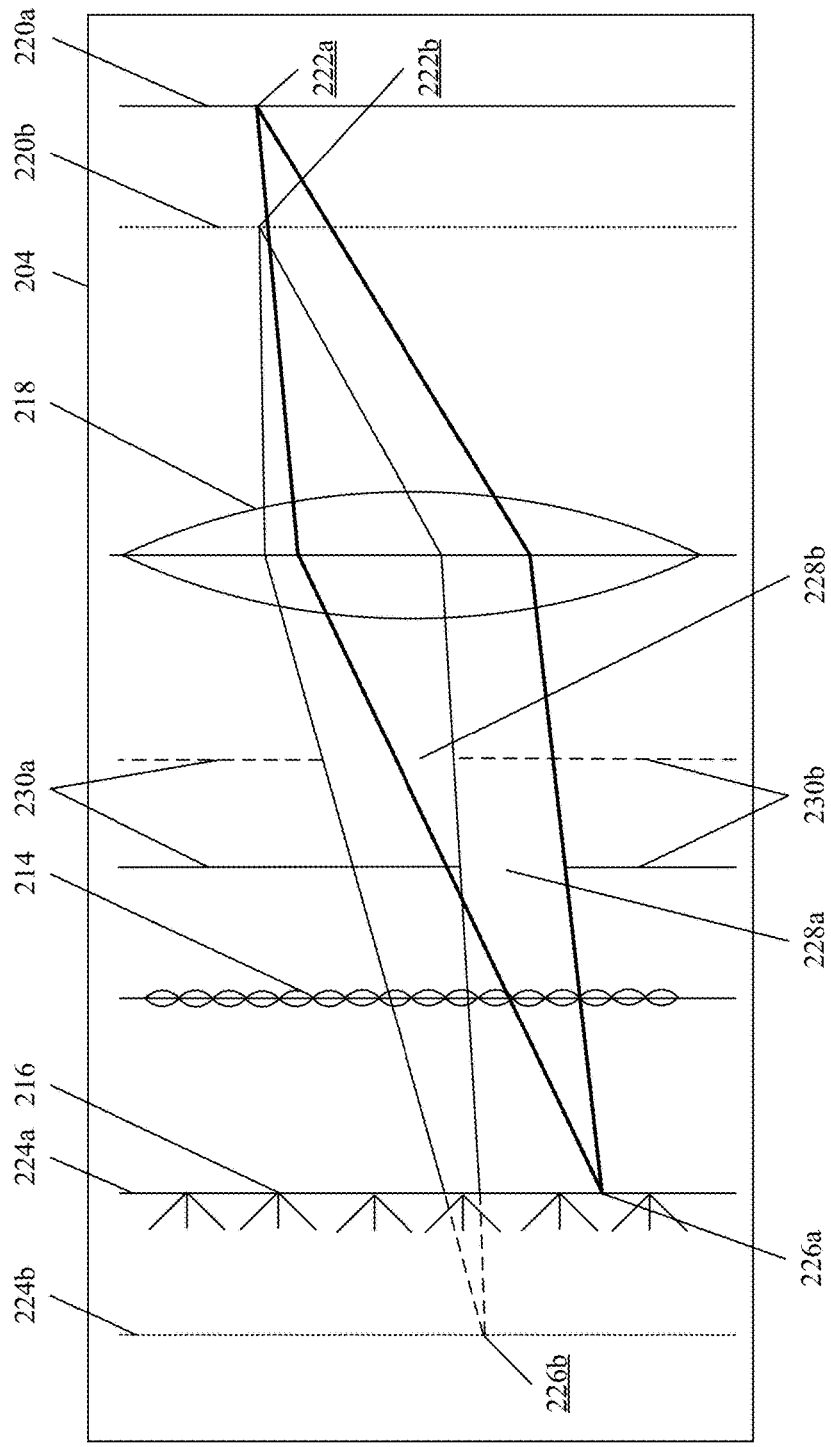

FIGS. 2A and 2B are detailed block diagrams that illustrate an exemplary electronic device that generates a panoramic image, in accordance with an embodiment of the disclosure. FIG. 2A and 2B are explained in conjunction with elements from FIG. 1. With reference to FIG. 2A, the electronic device 102 may comprise one or more circuits, such as an application processor 202, LF sensing devices 204, a volatile memory 206, a non-volatile memory 208, input/output (I/O) devices 210, and a transceiver 212. The application processor 202 may be communicatively coupled to the LF sensing devices 204, the volatile memory 206, the non-volatile memory 208, the I/O devices 210, and the transceiver 212.

The application processor 202 may comprise suitable logic, circuitry, interfaces, and/or code that may be configured to execute a set of instructions stored in the non-volatile memory 208. The application processor 202 may be configured to process the LF data of the plurality of FOVs of the electronic device 102. In accordance with an embodiment, the application processor 202 may process the LF data based on realignment of the stored LF data. Based on the realignment of the stored LF data, a plurality of subjects in each of the plurality of fields-of-views (FOVs) may be refocused in a sequence. The application processor 202 may be further configured to generate a panoramic image based on the realignment of LF data associated with each of the plurality of FOVs. Examples of the application processor 202 may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a digital signal processor (DSP), a graphics processor unit (GPU), a coprocessor, and/or other processors or integrated circuits.

The LF sensing devices 204 may comprise suitable logic, circuitry, and/or interfaces that may be configured to store a machine code and/or a computer program having at least one code section executable by the application processor 202. The LF sensing devices 204 may comprise a micro-lens array. The micro-lens array comprises a plurality of micro-lenses. The LF sensing devices 204 may further comprise one or more photo-sensors that may include a plurality of photo-sensitive elements. The one or more photo-sensors may be disposed such that the light rays pass through the micro-lens array before the one or more photo-sensors are illuminated. Further, the micro-lens array, in conjunction with the one or more photo-sensors, may capture the LF data associated with the plurality of FOVs of the electronic device 102. The micro-lens array and the one or more photo-sensors of the LF sensing devices 204 may be implemented based on one or more technologies known in the art.

The volatile memory 206 may comprise suitable logic, circuitry, and/or interfaces that may be configured to store a machine-readable code and/or a computer program, with at least one code section executable by the application processor 202. The volatile memory 206 may be configured to temporarily store LF data of the plurality of subjects in each of the plurality of FOVs. Examples of implementation of the volatile memory 206 may include, but are not limited to, Random Access Memory (RAM), Dynamic Random Access Memory (DRAM), Static Random Access Memory (SRAM), Thyristor Random Access Memory (T-RAM), Zero-Capacitor Random Access Memory (Z-RAM), and/or cache memory.

The non-volatile memory 208 may comprise suitable logic, circuitry, and/or interfaces that may be configured to store a machine readable code and/or a computer program with at least one code section executable by the application processor 202. The non-volatile memory 208 may be further configured to store one or more algorithms to dynamically refocus on one or more subjects in the plurality of FOVs of the electronic device 102. The non-volatile memory 208 may be further configured to store plenoptic functions associated with the captured LF data. The non-volatile memory 208 may be further configured to store one or more user preferences received from a user, such as the user 112. The one or more user preferences may include a frame rate and/or a rate-of-change of focus of one or more subjects. Examples of implementation of the non-volatile memory 208 may include, but are not limited to, Read Only Memory (ROM), Hard Disk Drive (HDD), Solid-State Drive (SSD), flash memory, and/or a Secure Digital (SD) card.

The I/O devices 210 may comprise suitable logic, circuitry, interfaces, and/or code that may be configured to display the plurality of subjects of each of the plurality of FOVs on the display device 110. The I/O devices 210 may further comprise various input and output devices that may be configured to communicate with the application processor 202. The input devices of the I/O devices 210 may be further configured to receive one or more input from user 112 for selection of the one or more subjects from the set of focusable subjects. The input devices may be further configured to receive one or more input actions from the user 112 that correspond to one or more user preferences for generation of a panoramic image. The output devices of the I/O devices 210 may be further configured to display the generated panoramic image on the display device 110. Examples of the input devices may include, but are not limited to, a keyboard, a touch screen, a microphone, a camera, a motion sensor, a light sensor, and/or a docking station. Examples of the output devices may include, but are not limited to, the display device 110 and/or a speaker. The display device 110 may be configured to receive one or more input actions from the one or more users, via a touch-sensitive screen. Such one or more input actions may be received from the one or more users by means of a virtual keypad, a stylus, touch-based input actions, and/or a gesture. The display device 110 may be realized through several known technologies such as, but not limited to, Liquid Crystal Display (LCD) display, Light Emitting Diode (LED) display, plasma display, and/or Organic LED (OLED) display technology.

The transceiver 212 may comprise suitable logic, circuitry, interfaces, and/or code that may be configured to communicate with the application server 104 and/or the content server 106, via the communication network 108. The transceiver 212 may implement known technologies to support wired or wireless communication of the electronic device 102 with the communication network 108. The transceiver 212 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 212 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the LF sensing devices 204 of the electronic device 102 may be configured to capture LF data associated with a first FOV of the electronic device 102. The first FOV may comprise a plurality of subjects. The LF data of the first FOV may be captured based on illumination of the LF sensors of the LF sensing devices 204. In accordance with an embodiment, the captured LF data associated with the first FOV may be stored in the volatile memory 206 under the control of the application processor 202. The stored LF data may correspond to a seven-dimensional (7D) plenoptic function, known in the art of light-field photography. The 7Ds of the plenoptic function may correspond to position of the light ray in three dimensions, angles of the light ray in two directions of a two dimensional plane, time of incidence, and wavelength of the incident light rays. The application processor 202 may be configured to determine one or more parameters associated with each of the plurality of subjects in the first FOV, based on the LF data of the plurality of subjects. The one or more parameters may include, but are not limited to, a depth-of-field of each of the plurality of subjects in each of the plurality of FOVs, a frame rate associated with one or more frames determined based on the plurality of subjects, and/or a rate-of-change of focus from one subject of the plurality of subjects to other subject. The one or more parameters may be retrieved from the non-volatile memory 208.

In accordance with an embodiment, the application processor 202 may be configured to retrieve one or more algorithms from the non-volatile memory 208. Such one or more algorithms may identify a set of focusable subjects from the plurality of subjects in the first FOV. The retrieved one or more algorithms may correspond to one or more object-recognition techniques, such as pattern matching, edge detection, grayscale matching, and/or gradient matching. Notwithstanding, any other object-recognition technique may be used without limiting the scope of the disclosure.

In accordance with an embodiment, the application processor 202 may be configured to identify the set of focusable subjects from the plurality of subjects present in the first FOV, based on the one or more retrieved algorithms. The application processor 202 may be further configured to instruct the I/O devices 210 to display the identified set of focusable subjects. Based on the instructions received from the application processor 202, the I/O devices 210 may be configured to display the identified set of focusable subjects on the display device 110. The application processor 202 may be further configured to render bounding boxes and/or object markers to enclose the identified set of focusable subjects on the display device 110. The bounding boxes and/or object markers may correspond to a geometric shape that may enclose the identified set of focusable subjects. Such geometric shapes may be similar to a rectangle, a square, a circle, an oval, and/or the like.

In accordance with an embodiment, the I/O devices 210 may be configured to receive a user input from the user 112, via the display device 110, by use of touch-sensitive gestures. Notwithstanding, the user input may also be received by other user input provision methods, such as a voice-based input, a gesture-based input, hardware or software buttons based input, a joystick, or other input provision methods known in the art. The received user input may correspond to selection of a first subject and one or more other subjects from the set of focusable subjects displayed on the display device 110. In accordance with an embodiment, the received user input may correspond to de-selection of the selected one or more subjects from the set of focusable subjects. The one or more selected subjects may be de-selected based on removal of the bounding box and/or the object marker associated with the one or more selected subjects.

In accordance with an embodiment, another user input may be received from the user 112 to adjust the area enclosed by the bounding boxes and/or object markers associated with the selected one or more subjects. The other user input may be provided by the user 112, via a free-form gesture or an audio input, without limitation of the scope of the disclosure.

In accordance with an embodiment, the application processor 202 may be configured to store the captured LF data of the selected one or more subjects in the non-volatile memory 208 of the electronic device 102. The application processor 202 may be further configured to delete the captured LF data from the volatile memory that corresponds to other subjects in the set of focusable subjects.

The application processor 202 may be configured to focus on a first subject from the selected one or more subjects. Such a focus on the first subject may be based on a first realignment of the stored LF data of the first subject. The application processor 202 may be configured to perform the first realignment of the stored LF data, based on one or more operations performed on the stored LF data with respect to the first subject. Based on the focus on the first subject, the application processor 202 may be configured to determine a first frame that comprises the focused first subject, based on the first realignment of the stored LF data.

Based on the received user input, the application processor 202 may be configured to dynamically refocus on one or more other subjects, such as a second subject, from the selected one or more subjects. In such a case, the refocus on the second subject may be based on a second realignment of the stored LF data. The second realignment of the stored LF data may be based on one or more operations performed on the stored LF data with respect to the second subject. Such one or more operations that focus the second subject may be similar to the one or more operations performed to focus the first subject. In accordance with an embodiment, the application processor 202 may be configured to determine a second frame that comprises the focused second subject, based on the second realignment of the stored LF data. The application processor 202 may be configured to determine a second frame that corresponds to the dynamically refocused second subject, based on the second realignment. Similarly, the application processor 202 may determine one or more other frames that comprise the focused one or more other subjects, based on corresponding realignments of the stored LF data.

In accordance with an embodiment, the first realignment and the second realignment of the stored LF data may correspond to modification of one or more parameters associated with the stored LF data associated with the FOV. Examples of the one or more parameters may include, but are not limited to, a depth-of-field of the focused first subject and the dynamically refocused one or more other subjects in the FOV, aperture diameter of main lens, inverse magnification factor of the plurality of micro-lenses in the micro-lens array, F-number for the plurality of micro-lenses in the micro-lens array, focal length of the plurality of micro-lenses in the micro-lens array, depth-of-field of the first FOV, wavelength of light, and/or pixel size of pixels in the one or more photo-sensors of the LF sensing devices 204. In accordance with an embodiment, the first realignment and/or the second realignment may be based on a depth-of-field of the focused first subject and/or the dynamically refocused second subject, respectively. The first realignment and the second realignment are performed such that the depth-of-field information of the selected one or more subjects from the set of focusable subjects is stored in the generated panoramic image. Such stored depth-of-field information of the selected one or more subjects may provide a depth perception in the generated panoramic image. In accordance with an embodiment, the first realignment and/or the second realignment may be based on a frame rate that corresponds to a rate-of-change of frame. For example, the frame rate may correspond to a rate-of-change from the determined first frame to the determined second frame. In accordance with an embodiment, the first realignment and/or the second realignment may be based on a rate-of-change of focus from the focused first subject to the dynamically refocused second subject.

In accordance with an embodiment, the application processor 202 may be configured to create a first stack of frames that correspond to the first FOV. The first stack of frames may comprise the determined first frame and/or the determined one or more other frames. The determined first frame and/or the determined one or more other frames may comprise the focused first subject and/or the focused one or more other subjects, respectively. The application processor 202 may be further configured to store the first stack of frames in the volatile memory 206. Notwithstanding, the disclosure may not be so limited, and application processor 202 may be further configured to store the first stack of frames in non-volatile memory 208, without limitation of the scope of the disclosure.

The application processor 202 may be further configured to create one or more subsequent stacks of frames that correspond to the one or more subsequent FOVs. The application processor 202 may be configured to combine the created first stack of frames and the created subsequent stacks of frames. The combination of the created first stack of frames and the created subsequent stacks of frames may comprise panoramic LF image stitching, by use of one or more LF image stitching techniques known in the art.

The application processor 202 may be further configured to generate a panoramic image based on the stitched first stack of frames and the subsequent stacks of frames. The stitched first stack of frames and the subsequent stacks of frames may include one or more inconsistencies, such as parallax error, lens distortion, scene motion, and exposure differences. Such one or more inconsistencies may be resolved by use of one or more algorithms known in the art.

The application processor 202 may be further configured to generate a panoramic image, based on the stitched first stack of frames and the subsequent stacks of frames. The generated panoramic image may correspond to a motion picture, a Light-field Picture (LFP) image, a Graphics Interchange Format (GIF) image, or a Joint Photographic Experts Group (JPEG) image.

In accordance with an embodiment, the I/O devices 210 may be configured to retrieve one or more user preferences from the user 112, via the display device 110. The one or more user preferences may be received via the display device 110, based on one or more touch-sensitive gestures. In accordance with an embodiment, the one or more user preferences may be received by the electronic device based on one or more audio input actions. The one or more user preferences may correspond to a frame rate associated with the display of the determined first frame and the determined one or more other frames associated with each of FOV of the plurality of FOVs. The one or more user preferences may correspond to a rate-of-change of focus between the subjects that correspond to the selected one or more subjects, which correspond to the first FOV. The user preferences may further correspond to the selected one or more subjects, which correspond to the one or more subsequent FOVs. Notwithstanding, the disclosure may not be so limited, and the frame rate and/or the rate-of-change of focus of the generated panoramic image may be based on pre-stored values stored in the volatile memory 206 or the non-volatile memory 208, without limitation of the scope of the disclosure.

In accordance with an embodiment, the application processor 202 may be configured to render the generated panoramic image on the display device 110, based on the received one or more user preferences and/or pre-stored values that correspond to the frame rate and/or the rate-of-change of focus. In accordance with an embodiment, the application processor 202 may be configured to transmit the generated panoramic image to the content server 106 for storage, via the transceiver 212.

In accordance with an embodiment, the selected one or more subjects may be sequentially focused in the generated panoramic image. In accordance with an embodiment, the sequence of focus may correspond to a sequence of selection of the one or more subjects in the received user input. In accordance with an embodiment, the sequence of focus may correspond to the received user preferences. Further, the application processor 202 may be configured to display the selected one or more subjects in the generated panoramic image, based on the received one or more user preferences and/or the pre-stored values, present in the non-volatile memory 208.

With reference to FIG. 2B, a detailed functional diagram of the LF sensing device 204 is illustrated. The LF sensing devices 204 may comprise suitable logic, circuitry, and/or interfaces that may be configured to store a machine code and/or a computer program having at least one code section executable by the application processor 202. The LF sensing devices 204 may comprise a micro-lens array 214 and/or a plurality of light sensors 216. The LF sensing devices 204 may further comprise main lens 218. The main lens 218 may be disposed between the micro-lens array 214 and a first object plane 220a that may comprise an object 222a to be focused. The plurality of the light sensors 216 may be considered as a first image plane 224a that may form an image 226a of the object 222a. Further, the micro-lens array 214, in conjunction with the one or more light sensors of the plurality of light sensors 216 and the main lens 218, may be configured to capture the LF data associated with one or more objects, such as the object 222a, in the plurality of FOVs of the electronic device 102. The main lens 218 in the LF sensing device 204 may be associated with a pinhole at a position 228a. The pinhole at the position 228a may correspond to an aperture between slits, such as 230a and 230b. The application processor 202 may be configured to create a second object plane 220b based on a digital refocusing algorithm, known in the art. The second object plane 220b may correspond to a virtual plane that may be disposed between the first object plane 220a and the main lens 218. The application processor 202 may be further configured to create a second image plane 224b. The second image plane 224b may be the virtual plane placed to the left of the first image plane 224a, as depicted in FIG. 2B.

The micro-lens array 214 may comprise plurality of the micro-lenses. Further, the number of micro-lenses and/or the size of the array may be pre-determined based on one or parameters associated with each micro-lens. The one or more parameters may comprise at least size of the each micro lens and a focal length of each of the micro lens in the micro-lens array 214. In an implementation, the focal length of each of the micro lens may be less than the focal length of the main lens 218 by a pre-determined value. Further, when the light ray originating from the first object plane 220a passes through the main lens 218 it may pass through the array of micro-lens array 214, such that each micro lens of the micro-lens array 214 may form individual image of an object, such as the image 226a, on the plurality of light sensors 216.

The plurality of light sensors 216 may comprise plurality of the light sensitive elements, which may be configured to generate LF data based on illumination by the light ray that may originate from the object on the first object plane 220a. In an implementation, the LF data may correspond to a multi-dimensional data. The one or more dimensions of the multi-dimensional LF data may comprise one or more axes in a space, an angle of incidence of the light ray from the first object plane 220a on the plurality of light sensors 216, time at which the light ray from the object is allowed to strike on the plurality of light sensors 216, and/or a wavelength of the light ray. In an implementation, the LF data may be processed by one or more servers, such as the application server 104 and/or the content server 106. In another implementation, the LF data may be processed by the application processor 202, as described above. Further, the light rays that pass through the micro-lens array 214 strike on the plurality of light sensors 216 to create the image 226a of the object 222a on the first image plane 224a. The plurality of light sensors 216 may correspond to a pre-determined number of pixels.

The main lens 218 may be an optical device that may focus the light rays (originating from the object 222a in the first object plane 220a) on the plurality of light sensors 216. The main lens 218 may be positioned between the micro-lens array 214 and the first object plane 220a that includes that object 222a to be focused. The main lens 218 in conjunction with the micro-lens array 214 may focus the light rays on the first image plane 224a, based on pre-determined focal lengths of the main lens 218 and the micro-lens array 214. The type of the main lens 218 may be biconvex, as shown in FIG. 2B. Notwithstanding, the disclosure may not be so limited, and the main lens 218 and/or the micro-lens array 214 may be of other types, such as biconcave, plano-convex, plano-concave, positive meniscus, and/or a combination of same or different lens types thereof, without departure from the scope of the disclosure.

In accordance with an embodiment, a light ray incident on the LF sensing device 204 may be represented by one or more parameterization techniques, known in the art. An example of such parameterization techniques may include, but is not limited to, a two-plane parameterization that may comprise a mathematical operation to generate two parallel planes. In accordance with the two-plane parameterization technique, a plane of the main lens 218 may correspond to a "uv-plane" and another plane of the micro-lens array 214 may correspond to a "st-plane". The "uv-plane" and/or the "st-plane" may be two parallel planes used for the two-plane parameterization technique. Accordingly, the parameterization of the light ray may be performed when the light ray in the LF sensing device 204 passes through the "uv-plane" and/or the "st-plane".

In operation, the LF sensing device 204 in conjunction with the application processor 202, may be configured to perform an operation that corresponds to a digital movement of the pinhole at the position 228a and/or the main lens 218.The digital movement may correspond to movement of a group of the light rays that pass through the micro-lens array 214. The light rays from each of the group may be allowed to pass through the pinhole at the position 228a. The application processor 202 may be further configured to perform adjustment of the position 228a of the pinhole to a new position 228b. In accordance with an embodiment, the application processor 202 may be configured to adjust the position 228a of the pinhole the new position 228b of the pinhole based on adjustment of the aperture between the slits 230a and 230b. The application processor 202 may be further configured to perform computational realignment of the LF data obtained after the digital movement of the position 228a of the pinhole (to the new position 228b) and/or the position of the main lens 218 to minimize the artefacts, such as image distortion, in the plurality of FOVs of the electronic device 102.

In accordance with an embodiment, the LF sensing device 204 in conjunction with application processor 202 may be configured to digitally perform dynamic refocusing on the one or more objects in the first object plane 220a. The dynamic refocusing may be performed based on use of a second object plane 220b that may be determined by the application processor 202. The dynamic refocusing may be further performed without any change in focus setting based on the computational realignment of LF data associated with the FOV, as explained in FIG. 2A. Further, a position of the second object plane 220b from the first object plane 220a and the main lens 218 may be pre-determined by the application processor 202, based on a pre-stored algorithm, known in the art. In accordance with an embodiment, the application processor 202 may be configured to determine the second object plane 220b that may be laterally displaced from the first object plane 220a, towards the main lens 218. The sharpness of the focusable subjects from the plurality of subjects present in an FOV of the plurality of FOVs may be based on the position of the second object plane 220b.

In accordance with an embodiment, the one or more objects may be associated with the second object plane 220b. Based on the virtually displaced first object plane 220a, the object 222a may be displaced to the virtual object 222b on the second object plane 220b. Further, based on the displacement of the object 222a, a new image may be formed on the second image plane 224b. Such a second image plane 224b may also be laterally displaced towards the left of the first image plane 224a. In accordance with an embodiment, the application processor 202 may be used to determine the position of the second image plane 224b from the first image plane 224a based on a pre-stored algorithm, present in the non-volatile memory 208, known in the art.

Based on the lateral displacement, the virtual image 226b of the virtual object 222b may be formed on the second image plane 224b image 226a. In accordance with an embodiment, the dynamic refocusing in the LF sensing device 204 may further comprise a summation of the LF data that corresponds to one or more windows. Such one or more windows may correspond to the light rays emanating from the object 222a or the virtual object 222b. The LF data may further correspond to a data extracted from the plurality of micro-lenses of the micro-lens array 214. Such extracted data may correspond to a position of the object 222a or the virtual object 222b at a fixed depth of focus.

In accordance with an embodiment, the LF sensing device 204 in conjunction with application processor 202 may be configured to perform a digital stopping down operation. The digital stopping down operation may comprise incrementing in an "F-number" as explained in FIG. 2A. The "F-number" may correspond to a focal length of the main lens 218. Based on the increment of the "F-number", the size of aperture of the main lens 218 may be decremented to increase the depth of field of the one or more focusable objects to enhance the sharpness of the one or more focusable objects. In accordance with an embodiment, the digital stopping down operation may include the summation of the LF data associated with a central portion of the one or more micro lens of the micro-lens array 214, for the depth of focus. Further, the LF data associated with the central portion of the one or more micro lens of the micro-lens array 214, for the depth of focus, may be obtained by use of the pinhole at the position 228a.

In accordance with an embodiment, in order to generate the panoramic image, the application processor 202 may be configured to perform the aforementioned operations, such as the digital movement, the dynamic refocusing, and/or the digital stopping down, individually for each object. In accordance with an embodiment, the application processor 202 may be configured to perform the aforementioned operations in one or more combinations. Based on the aforementioned operations, one or more parameters associated with the FOV in the frame may be modified. Such one or more parameters may include, but are not limited to, sharpness, brightness, resolution, of a generated panoramic image. Further, the application processor 202 may be configured to perform the aforementioned one or more operations based on the seven-dimensional plenoptic function as mentioned in FIG. 2A.

Figure 3A:
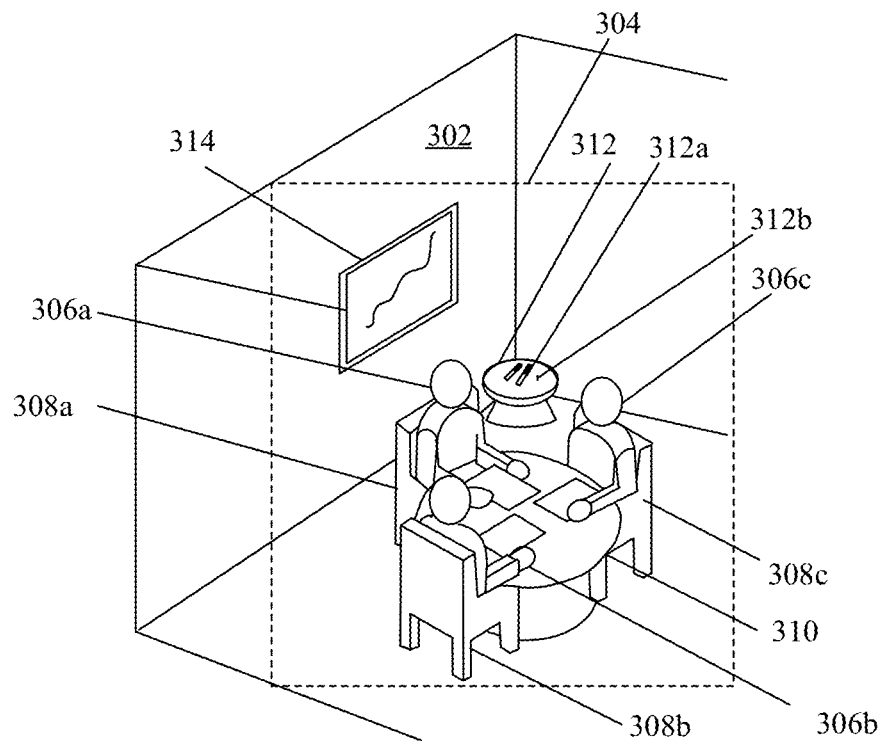
FIGS. 3A to 3E are diagrams that illustrate exemplary scenarios for generation of a panoramic image, in accordance with an embodiment of the disclosure.

FIGS. 3A to 3E are diagrams that illustrate exemplary scenarios for generation of a panoramic image, in accordance with an embodiment of the disclosure. FIG. 3A to 3E are explained in conjunction with elements from FIGS. 1 and 2. With reference to FIG. 3A, an exemplary view of a conference room 302 is illustrated. The conference room 302 may comprise an exemplary field-of-view (FOV) 304 of the electronic device 102. The exemplary FOV 304 may comprise one or more subjects, such as a first subject 306a, a second subject 306b, and a third subject 306c. The first subject 306a, the second subject 306b, and the third subject 306c may be seated across a conference table 310 on a first seating object 308a, a second seating object 308b, and a third seating object 308c, respectively. The FOV 304 may further comprise a first object that may correspond to a side table 312 and a second object that may correspond to a white board 314. The FOV may further comprise a third object, such as highlighters 312a, that may be placed on the side table 312, and may be used to highlight a portion of the white board 314. Further, each of the one or more subjects, and/or the one or more objects may be associated with a depth-of-field, with respect to the FOV 304 of the electronic device 102.

Figure 3B:
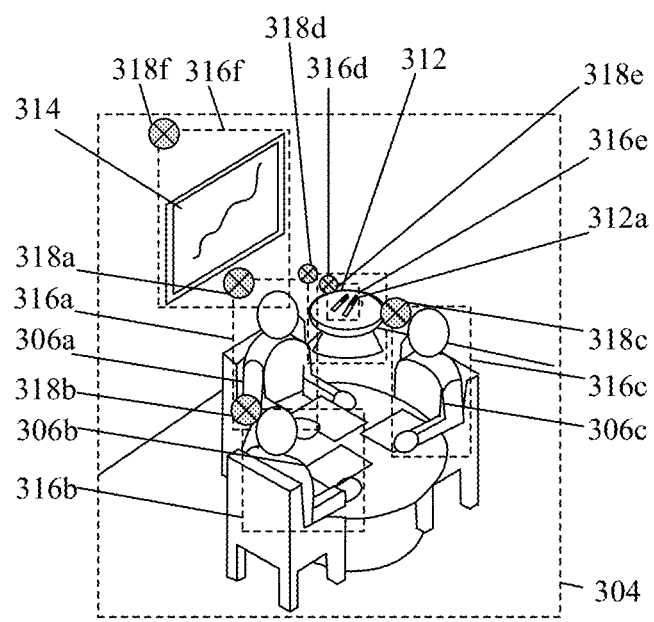

With reference to FIG. 3B, an exemplary scenario for identification of set of focusable subjects in the FOV 304 of the electronic device 102, is illustrated. In accordance with the exemplary scenario, the LF sensing devices 204 of the electronic device 102 may be configured to capture the LF data of each of the one or more subjects and/or each of the one or more objects present in the FOV 304. In accordance with an instance of the exemplary scenario, the application processor 202 may be configured to store the captured LF data of each of the one or more subjects and/or each of the one or more objects present in the FOV 304, in the volatile memory 206. Based on the captured LF data, the application processor 202 may be configured to identify a set of focusable subjects and/or another set of focusable objects present in the FOV 304. The identification of the set of focusable subjects and/or the other set of focusable objects in the FOV may be based on the object recognition techniques, as explained in FIG. 2B.

The application processor 202 may be configured to associate a rectangular bounding box with each of the identified sets of focusable subjects and/or other sets of focusable objects present in the FOV 304. The application processor 202 may be configured to associate a bounding box 316a with the first subject 306a, a bounding box 316b with the second subject 306b, and/or a bounding box 316c with the third subject 306c. Similarly, the application processor 202 may be configured to associate a bounding box 316d with the side table 312, a bounding box 316e with the highlighters 312a, and/or a bounding box 316f with the white board 314. Each of the bounding boxes 316a to 316f, may comprise an associated user interface (UI) elements 318a to 318f, respectively. The I/O devices 210 may be configured to display the identified one or more subjects and/or the one or more objects, along with the associated bounding boxes and the associated UI elements, on the display device 110.

In accordance with the exemplary scenario, the I/O devices 210 may be configured to receive one or more user input actions that correspond to the bounding boxes 316a to 316f of the displayed one or more subjects and/or the one or more objects. The received one or more user input actions may correspond to selection one or more subjects from the displayed set of focusable subjects and/or the one or more focusable objects. Another user input may be provided by the user 112 to de-select subjects and/or objects from the selected one or more subjects and/or the one or more objects to be focused on in the generated panoramic image. The application processor 202 may be further configured to store the captured LF data of the selected subjects and/or objects in the non-volatile memory 208. The application processor 202 may be further configured to delete the captured LF data of the de-selected subjects from the displayed one or more subjects and/or the one or more objects, from the volatile memory 206.

In accordance with an instance of the exemplary scenario, the application processor 202 may be configured to adjust the area enclosed by the bounding boxes 316a, 316b, 316c, 316d, 316e, and/or 316f, based on the received one or more user inputs. The application processor 202 may be further configured to deselect one or more of displayed set of focusable subjects and/or the one or more focusable objects based on the UI elements 318a, 318b, 318c, 318d, 318e, and/or 318f associated with the displayed bounding boxes. The de-selection may be based on the received one or more user inputs.

In accordance with an embodiment, the application processor 202 may be configured to focus on the first subject 306a, based on computational realignment of the captured LF data of the first subject 306a. The application processor 202 may be further configured to dynamically refocus on the second subject 306b and the third subject 306c. Refocus may be further based on dynamic computational realignment of the captured LF data of the second subject 306b and the third subject 306c. Similarly, the application processor may be configured to dynamically refocus on the side table 312, highlighters 312a, and/or the white board 314, based on dynamic computational realignment of the captured LF data of the side table 312, highlighters 312a, and/or the white board 314. In accordance with an instance of the exemplary scenario, the application processor 202 may be configured to perform simultaneous computational realignment of the LF data of the identified set of focusable subjects and/or the other set of focusable objects.

Figure 3C:
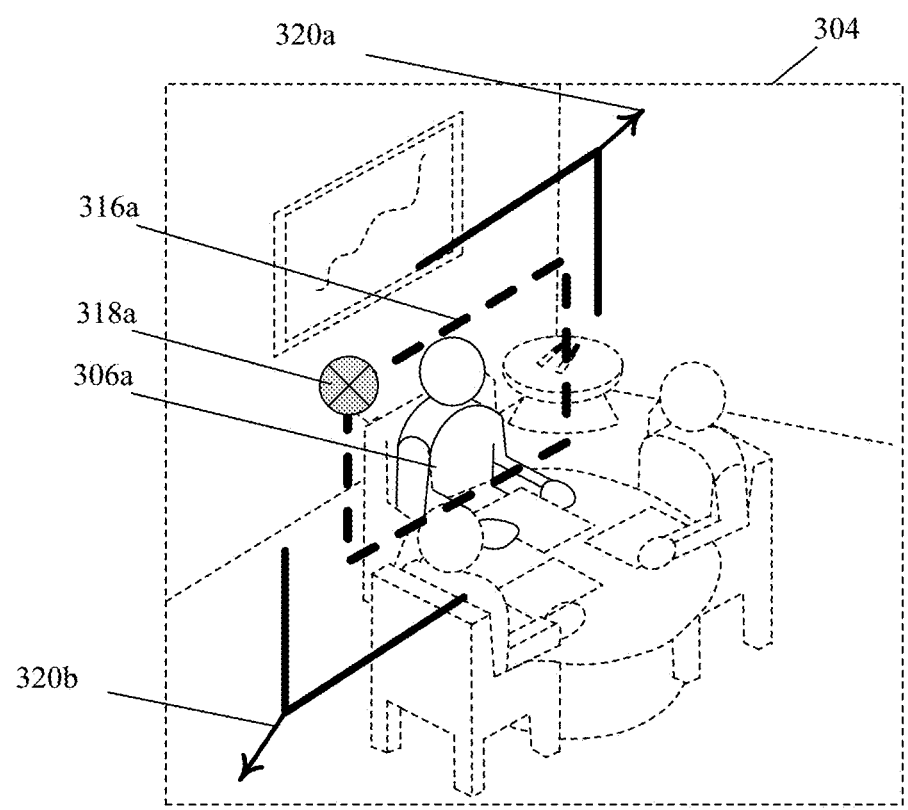

With reference to FIG. 3C, an exemplary scenario to display a bounding box associated with a subject of the identified one or more subjects and/or the one or more objects, on the display device 110, is illustrated. The bounding box may correspond to the bounding box 316a, associated with the first subject 306a. In accordance with an embodiment, the bounding box 316a may be displayed on the display device 110, such that it encloses at least a portion of the first subject 306a. However, based on the user input received by the application processor, via the I/O devices 210, the dimensions of the bounding box 316a may be adjusted. Such an adjustment of the dimensions of the bounding box may be performed to increase and/or decrease the area of the enclosed portion of the first subject 306a.

Further, such an adjustment of the dimensions may be performed when the user input corresponds to a pinch-in or a pinch-out operation. The pinch-in or pinch-out operation may be performed by dragging the edges or vertices of the bounding box in a given direction, such as the directions 320a and 320b. The pinch-in or the pinch-out operation may be performed based on dragging the sides of the bounding box in the direction opposite to the directions 320a and 320b. Based on the received user input on the display device 110, the application processor 202 may be configured to perform similar adjustments of the dimensions of the bounding boxes 316b to 316f. The application processor 202 may be further configured to store the captured LF data of the subjects enclosed in the adjusted bounding boxes 316a to 316f, in the non-volatile memory 208.

Figure 3D:
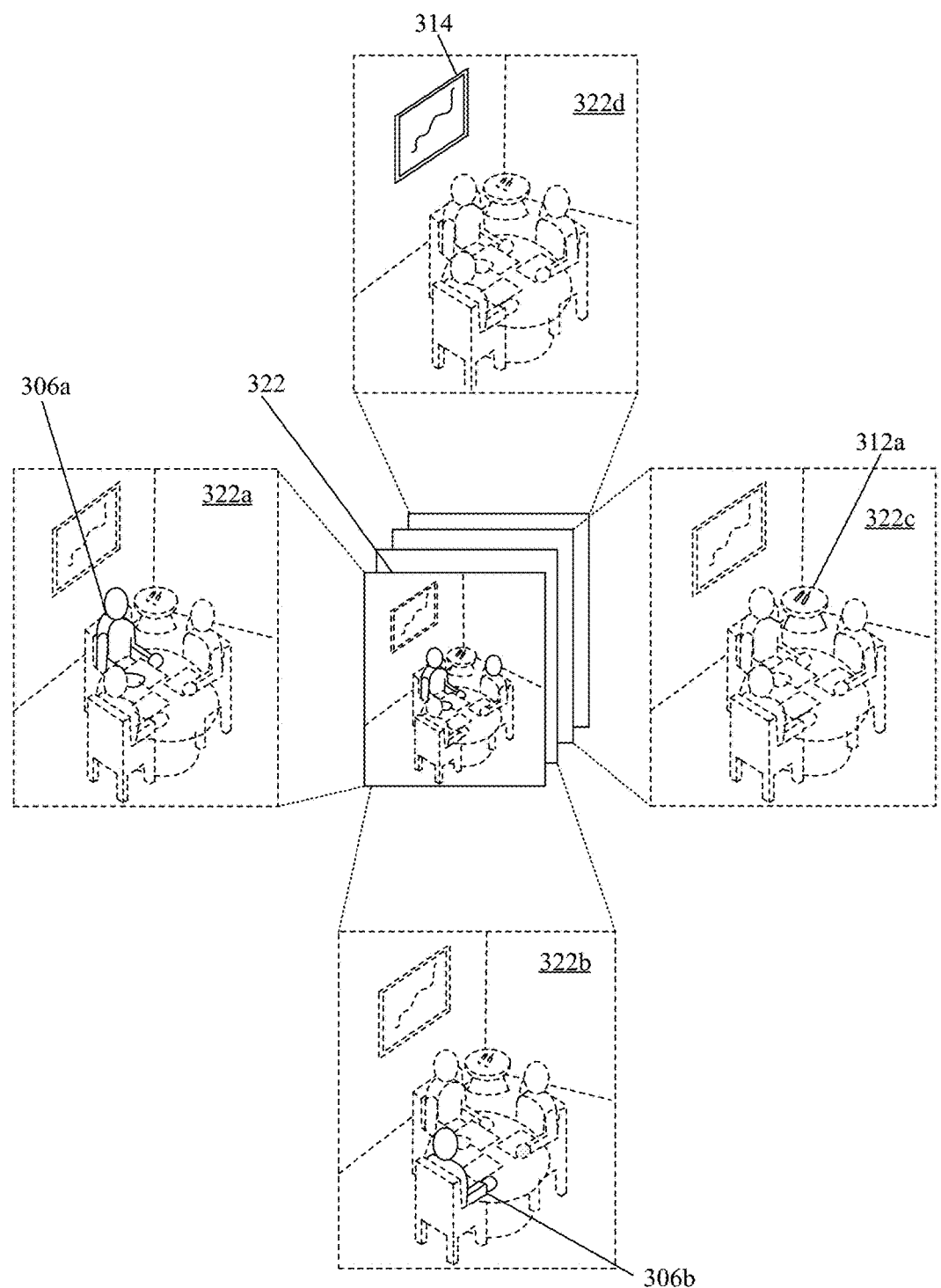

With reference to FIG. 3D, an exemplary scenario for creation of a stack of frames 322 of the FOV 304 that corresponds to the selected subjects from the displayed one or more subjects and/or one or more objects, is illustrated. In accordance with an exemplary scenario, the received user input may correspond to selection of the first subject 306a, the second subject 306b, the highlighters 312a, and/or the white board 314. The selection of the first subject 306a, the second subject 306b, the highlighters 312a, and/or the white board 314 may be performed in a first sequence.

Based on the user input, the application processor 202 may be configured to focus on the first subject 306a, based on computational realignment of the captured LF data of the first subject 306a, as explained in FIG. 3C. The application processor 202 may be further configured to generate a frame 322a, which corresponds to the first subject 306a, based on the computational realignment. The application processor 202 may be further configured to dynamically refocus on the selected second subject 306b, the selected highlighters 312a, and the selected white board 314, based on dynamic computational realignment of the captured LF data of the second subject 306b, and the third subject 306c, as explained in FIG. 3C. The application processor 202 may be further configured to generate frames 322b, 322c, and 322d. The frame 322a may correspond to the first subject 306a, the frame 322b may correspond to the second subject 306b, the frame 322c may correspond to the highlighters 312a, and the frame 322d may correspond to the white board 314. Each of the generated frames 322a, 322b, 322c, and 322d may further correspond to the stack of frames 322 of the FOV 304. The stack of frames 322 of the FOV 304 may further comprise the depth-of-field information associated with each of the selected subjects.

In accordance with an instance of the exemplary scenario, the application processor 202 may be configured to sequence the created frames 322a, 322b, 322c, and/or 322d of the created stack of frames 322 in the first sequence. In accordance with another instance of the exemplary scenario, the application processor 202 may be configured to sequence the created frames 322a, 322b, 322c, and/or 322d of the created stack of frames 322 based on one or more user preferences retrieved from the non-volatile memory 208. The stack of frames 322 may be further associated with one or more parameters, based on the received one or more user preferences and/or the pre-stored values in the non-volatile memory 208. The one or more parameters may correspond to the frame rate and/or the rate-of-change of focus between the selected first subject 306a, the second subject 306b, the highlighters 312a, and/or the white board 314.

In accordance with an instance of the exemplary scenario, the application processor 202 may be configured to create one or more subsequent stacks of frames similar to the created stack of frames 322 of the FOV 304. Such created one or more subsequent stacks of frames may correspond to one or more subsequent FOVs of the electronic device 102.

Figure 3E:
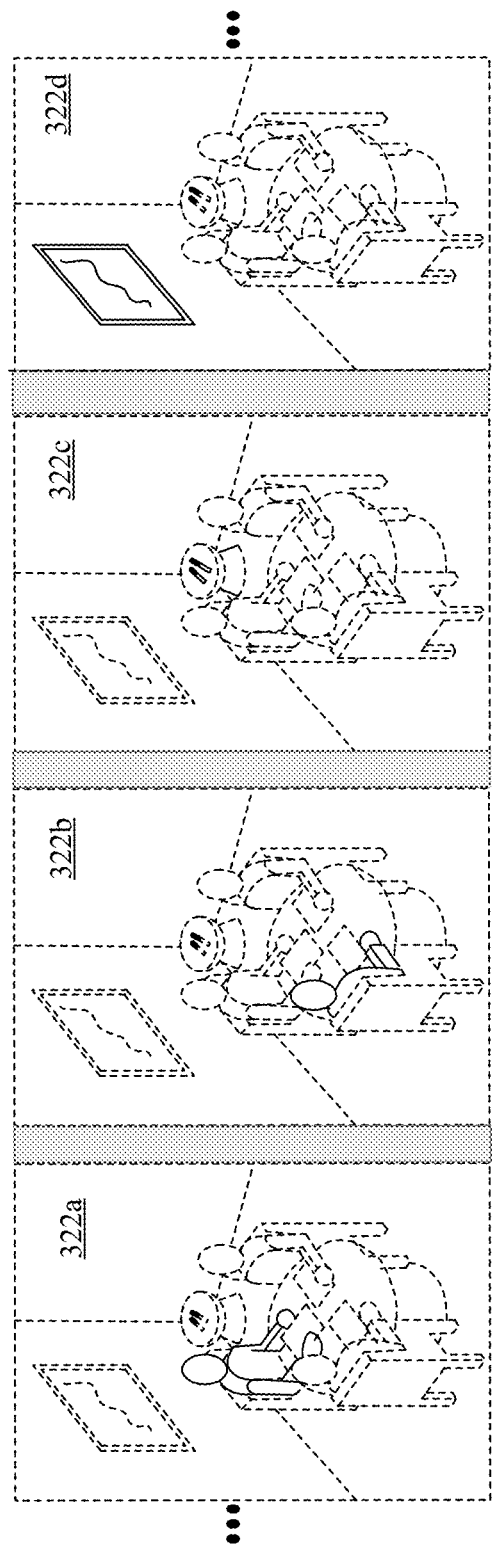

With reference to FIG. 3E, an exemplary scenario for generation of a panoramic image based on LF image stitching of the created stack of frames 322 of the FOV 304, is illustrated. In accordance with an exemplary scenario, the application processor 202 may be configured to arrange the created frames 322a, 322b, 322c, and/or 322d of the stack of frames 322 in a sequence based on the user preferences. The created frames 322a, 322b, 322c, and/or 322d may comprise overlapping FOVs.

In accordance with an instance of the exemplary scenario, the application processor 202 may be configured to arrange one or more other frames of the one or more subsequent stacks of frames in a sequence, based on the user preferences. Such one or more other frames, of the one or more subsequent stacks of frames, may correspond to one or more subsequent FOVs of the electronic device 102. The one or more other frames of the one or more subsequent stacks of frames may comprise FOVs that overlap. The application processor 202 may be further configured to combine the created frames 322a, 322b, 322c, and/or 322d of the stack of frames 322 and one or more other frames of the one or more subsequent stacks of frames.

The application processor 202 may be further configured to minimize the parallax error associated with the selected subjects in the created frames 322a, 322b, 322c, and/or 322d of the stack of frames 322. The combination of the created frames 322a, 322b, 322c, and/or 322d of the stack of frames 322, and one or more other frames of the one or more subsequent stacks of frames, may be based on LF image stitching (as described in FIG. 2B). The application processor 202 may be further configured to render the generated panoramic image on the display device 110. The generated panoramic image may correspond to a pseudo three-dimensional image that contributes to the depth perception of the selected one or more subjects. Each of the one or more selected subjects may be focused sequentially in the rendered panoramic image. The generated panoramic image may be rendered based on one or more user preferences and/or the pre-stored values in the non-volatile memory 208. The one or more parameters may correspond to the frame rate and/or the rate-of-change of focus between the selected first subject 306a, the second subject 306b, the highlighters 312a, and/or the white board 314.

Figure 4:
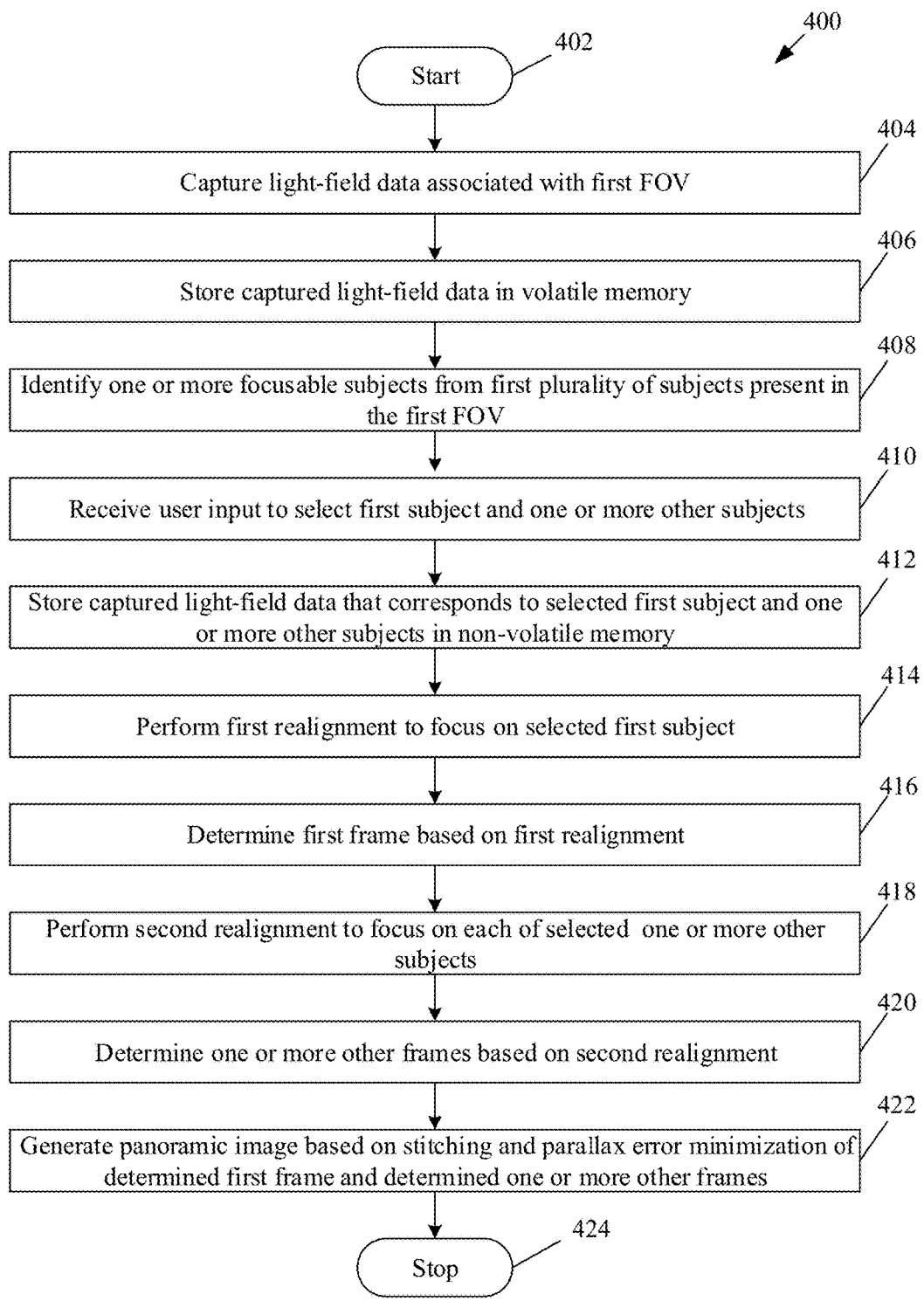
FIG. 4 comprises a flowchart that illustrates a method for generation of a panoramic image, in accordance with an embodiment of the disclosure.

FIG. 4 comprises a flowchart that illustrates a method for generation of a panoramic image, in accordance with an embodiment of the disclosure. With reference to FIG. 4, there is shown a first flowchart 400. The first flowchart 400 is described in conjunction with FIG. 1. The method starts at step 402 and proceeds to step 404.

At step 404, LF data associated with a first FOV of the electronic device 102 may be captured. At step 406, the captured LF data associated with the first FOV may be stored in a volatile memory. At step 408, set of focusable subjects, such as a first subject and one or more other subjects, may be identified from the first plurality of subjects present in the first FOV of the electronic device 102. The set of focusable subjects may be indicated on the display device 110, based on a bounding box and/or an object marker.

At step 410, a user input to select the first subject and the one or more other subjects, may be received. The user input may comprise a pinch-in or a pinch-out operation on the bounding box and/or the object marker associated with the first subject and the one or more other subjects. At step 412, the captured LF data associated with the FOV that corresponds to the selected first subject and the one or more other subjects, may be stored in the volatile memory. At step 414, a first realignment of the stored LF data of the first subject may be performed.

At step 416, a first frame that comprises the focused first subject may be determined based on the first realignment of the stored LF data. At step 418, a second realignment of the stored LF data of each of the one or more other subjects in the FOV may be performed. At step 420, one or more other frames that comprises the dynamically re-focused one or more other subjects may be determined based on the second realignment of the stored LF data.

At step 422, a panoramic image, based on the combination of the determined first frame and the determined one or more other frames, may be generated. The determined first frame and the determined two or more other frames may be stitched to generate the panoramic image. Further, parallax error that corresponds to the stitched two or more frames from the determined first frame and the determined one or more other frames, may be minimized. The control passes to end step 424.

In accordance with an embodiment of the disclosure, the system for generation of a panoramic image is disclosed. The system may comprise one or more circuits, such as the application processor 202. The application processor 202 of the electronic device 102 may comprise a micro-lens array, which further comprises a plurality of micro-lenses, in conjunction with a light sensor, may be configured to capture LF data associated with the FOV of the imaging device. To determine a first frame, the application processor 202 may be configured to focus on a first subject, based on a first realignment of the stored LF data associated with the first subject in the FOV. To determine one or more other frames, the application processor 202 may be configured to dynamically refocus on one or more other subjects, based on a second realignment of the captured LF data of each of the one or more other subjects in the FOV. The application processor 202 may be further configured to generate a panoramic image, based on combination of the determined first frame and the determined one or more other frames.

Various embodiments of the disclosure may provide a non-transitory, computer readable medium and/or storage medium, and/or a non-transitory machine readable medium and/or storage medium stored thereon, a machine code and/or a computer program with at least one code section executable by a machine and/or a computer for generation of a panoramic image. The at least one code section may cause the machine and/or computer to perform the steps that comprise focus of a micro-lens array on a first subject. The first subject may be focused to determine a first frame, based on a first realignment of the stored LF data associated with the first subject in the FOV. The micro-lens array may further comprise a plurality of micro-lenses. The micro-lens array, in conjunction with a light sensor, may be configured to capture LF data associated with a FOV of the imaging device. The steps may further comprise dynamic refocusing on one or more other subjects, based on a second realignment of the captured LF data of each of the one or more other subjects in the FOV, to determine one or more other frames. Based on the combination of the determined first frame and the determined one or more other frames, a panoramic image may be generated.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An imaging device, comprising:
   a micro-lens array which comprises a plurality of micro-lenses in conjunction with a light sensor, wherein said plurality of micro-lenses are configured to capture light-field (LF) data associated with a field-of-view (FOV) of said imaging device; and
   circuitry configured to:
      focus on a first subject based on a first realignment of said captured LF data of said first subject in said FOV, to determine a first frame;
      dynamically refocus on at least one second subject based on a second realignment of said captured LF data of said at least one second subject in said FOV, to determine at least one second frame; and
      generate a panoramic image based on combination of said determined first frame and said determined at least one second frame,
      wherein at least one of said first realignment of said captured LF data of said first subject or said second realignment of said captured LF data of said at least one second subject is based on a frame rate that corresponds to a rate of change of frame from said determined first frame to said determined at least one second frame.

2. The imaging device according to claim 1, wherein said circuitry is further configured to store said captured LF data associated with said FOV in a volatile memory.

3. The imaging device according to claim 1, further comprising a display screen, wherein said circuitry is further configured to indicate said first subject and said at least one second subject on the display screen of said imaging device, based on one of a bounding box or an object marker.

4. The imaging device according to claim 1, wherein said circuitry is further configured to receive a user input for said focus on said first subject and said dynamic refocus on said at least one second subject.

5. The imaging device according to claim 4, wherein said received user input corresponds to a selection of at least one subject from said first subject or said at least one second subject, and wherein each subject of said selected at least one subject is focused sequentially based on said generated panoramic image is rendered on a display screen.

6. The imaging device according to claim 5, wherein said received user input comprises one of a pinch-in user operation or a pinch-out user operation corresponding to one of a bounding box or an object marker associated with said first subject and said at least one second subject.

7. The imaging device according to claim 5, wherein said circuitry is further configured to store said captured LF data of said selected at least one subject in said FOV in a non-volatile memory.

8. The imaging device according to claim 1, wherein said focus on said first subject and said dynamic refocus on said at least one second subject are based on an algorithm.

9. The imaging device according to claim 1, wherein said first realignment and said second realignment of said captured LF data corresponds to modification of at least one parameter associated with said captured LF data associated with said FOV.

10. The imaging device according to claim 9, wherein said at least one parameter comprises at least one of a depth-of-field of said focused first subject and said dynamically refocused at least one second subject in said FOV, an aperture diameter of a main lens, an inverse magnification factor of said plurality of micro-lenses in said micro-lens array, a F-number for said plurality of micro-lenses in said micro-lens array, a focal length of said plurality of micro-lenses in said micro-lens array, a depth-of-field of said FOV, a wavelength of light, a pixel size of pixels in at least one photo-sensor of said imaging device, said frame rate, or a rate-of-change of focus between said first subject, a second subject of said at least one second subject, and at least one object in said FOV.

11. The imaging device according to claim 1, wherein said combination of said determined first frame and said determined at least one second frame comprises LF image stitching of at least two frames from said determined first frame and said determined at least one second frame.

12. The imaging device according to claim 11, wherein said circuitry is further configured to minimize parallax error corresponding to said LF image stitching of said at least two frames from said determined first frame and said determined at least one second frame.

13. The imaging device according to claim 1, wherein said circuitry is further configured to render said generated panoramic image, based on at least one user preference or values stored in a non-volatile memory, and wherein said at least one user preference includes one of said frame rate associated with said determined first frame and said determined at least one second frame, or a rate-of-change of focus of said imaging device between said focused first subject and said dynamically refocused at least one second subject.

14. The imaging device according to claim 1, wherein a format of said generated panoramic image corresponds to one of a motion picture, a Light-field Picture (LFP) image, a Graphics Interchange Format (GIF) image, or a Joint Photographic Experts Group (JPEG) image.

15. A method, comprising:
in an imaging device, comprising a micro-lens array which comprises a plurality of micro-lenses in conjunction with a light sensor, wherein said plurality of micro-lenses are configured to capture light-field (LF) data associated with a field-of-view (FOV) of said imaging device:
focusing on a first subject based on a first realignment of said captured LF data of said first subject in said FOV, to determine a first frame;
dynamically refocusing on at least one second subject based on a second realignment of said captured LF data of said at least one second subject in said FOV, to determine at least one second frame; and
generating a panoramic image based on combining said determined first frame and said determined at least one second frame,
wherein at least one of said first realignment of said captured LF data of said first subject or said second realignment of said captured LF data of said at least one second subject is based on a frame rate that corresponds to a rate of change of frame from said determined first frame to said determined at least one second frame.

16. The method according to claim 15, further comprising storing said captured LF data associated with said FOV in a volatile memory.

17. The method according to claim 15, wherein said first subject and said at least one second subject are indicated on a display screen of said imaging device, based on one of a bounding box or an object marker.

18. The method according to claim 15, wherein a user input is received for said focusing on said first subject and said dynamic refocusing on said at least one second subject.

19. The method according to claim 18, wherein said user input corresponds to a selection of at least one subject from said first subject or said at least one second subject, and wherein each subject of said selected at least one subject is focused sequentially based on said generated panoramic image is rendered on a display screen.

20. The method according to claim 19, wherein said user input comprises one of a pinch-in user operation or a pinch-out user operation corresponding to one of a bounding box or an object marker associated with said first subject and at least one second subject.

21. The method according to claim 19, further comprising storing said captured LF data of said selected at least one subject in said FOV in a non-volatile memory.

22. The method according to claim 15, wherein said focusing on said first subject and said dynamic refocusing on said at least one second subject are based on an algorithm.

23. The method according to claim 15, wherein said first realignment and said second realignment of said captured LF data corresponds to modification of at least one parameter associated with said captured LF data associated with said FOV.

24. The method according to claim 15, wherein said combining of said determined first frame and said determined at least one second frame comprises LF image stitching of at least two frames from said determined first frame and said determined at least one second frame.

25. The method according to claim 24, further comprising minimizing parallax error corresponding to said LF image stitching of said at least two frames from said determined first frame and said determined at least one second frame.

26. A non-transitory computer-readable medium having stored thereon computer-executable instructions that, when executed by a computer, cause the computer to perform operations, the operations comprising:
in an imaging device, comprising a micro-lens array which comprises a plurality of micro-lenses in conjunction with a light sensor, wherein said plurality of micro-lenses are configured to capture light-field (LF) data associated with a field-of-view (FOV) of said imaging device:
focusing on a first subject based on a first realignment of said captured LF data of said first subject in said FOV, to determine a first frame;
dynamically refocusing on at least one second subject based on a second realignment of said captured LF data of said at least one second subject in said FOV, to determine at least one second frame; and
generating a panoramic image based on combining said determined first frame and said determined at least one second frame,
wherein at least one of said first realignment of said captured LF data of said first subject or said second realignment of said captured LF data of said at least one second subject is based on a frame rate that corresponds to a rate of change of frame from said determined first frame to said determined at least one second frame.

* * * * *